US010142927B2

(12) United States Patent
Vecera et al.

(10) Patent No.: US 10,142,927 B2
(45) Date of Patent: Nov. 27, 2018

(54) SELECTION OF A MESH ACCESS POINT IN A WIRELESS MESH NETWORK

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 170 days.

(21) Appl. No.: 14/937,214

(22) Filed: Nov. 10, 2015

(65) Prior Publication Data
US 2017/0135033 A1 May 11, 2017

(51) Int. Cl.
*H04L 1/00* (2006.01)
*H04L 12/26* (2006.01)
(Continued)

(52) U.S. Cl.
CPC ........... *H04W 48/20* (2013.01); *H04W 48/06* (2013.01); *H04W 48/10* (2013.01);
(Continued)

(58) Field of Classification Search
CPC ..... H04W 84/12; H04W 80/04; H04W 72/06; H04W 72/085; H04W 48/10;
(Continued)

(56) References Cited

U.S. PATENT DOCUMENTS 7,586,888 B2 9/2009 Wang
8,305,996 B2 11/2012 Rahman et al.
(Continued)

FOREIGN PATENT DOCUMENTS

EP 2432269 A1 3/2012

OTHER PUBLICATIONS

Paul Wong, Vijay Varikota, Duong Nguyen, and Ahmed Abukmail, "Automatic Android-Based Wireless Mesh Networks," Aug. 14, 2014, pp. 313-320, Informatica 38 (2014) 313-320, School of Science and Computer Engineering, University of Houston—Clear Lake, Houston, TX 77058, USA, retrieved on Nov. 13, 2015 from http://www.informatica.si/index.php/informatica/article/viewFile/713/583.

(Continued)

*Primary Examiner* — Yemane Mesfin
*Assistant Examiner* — Abdelillah Elmejjarmi
(74) *Attorney, Agent, or Firm* — Haynes and Boone, LLP (57) ABSTRACT

An example method of transmitting data to a destination node in a wireless communications network includes detecting, at a wireless device, a plurality of mesh nodes connected to a common communications medium used to access a wireless communications network. The method also includes calculating a score for the mesh nodes of the plurality of mesh nodes, where the score is based on a hop distance between the respective mesh node and a root access point connected to the wireless communications network, the quality of signal between the wireless device and the respective mesh node, the data bandwidth between the wireless device and the respective mesh node, and/or the current number of mesh nodes using the respective mesh node as a wireless access point to connect to the wireless communications network. The wireless device selects a mesh node to connect to as a mesh access point based on the calculated scores.

20 Claims, 5 Drawing Sheets

(51) Int. Cl.

| | |
|---|---|
| *H04W 48/20* | (2009.01) |
| *H04W 48/06* | (2009.01) |
| *H04W 48/10* | (2009.01) |
| *H04W 72/04* | (2009.01) |
| *H04W 72/06* | (2009.01) |
| *H04W 72/08* | (2009.01) |
| *H04W 80/04* | (2009.01) |
| *H04W 88/08* | (2009.01) |
| *H04W 88/02* | (2009.01) |
| *H04W 84/04* | (2009.01) |

(52) U.S. Cl.
CPC ... *H04W 72/0453* (2013.01); *H04W 72/0486* (2013.01); *H04W 72/06* (2013.01); *H04W 72/085* (2013.01); *H04W 80/04* (2013.01); *H04W 84/042* (2013.01); *H04W 88/02* (2013.01); *H04W 88/08* (2013.01)

(58) Field of Classification Search
CPC ......... H04W 72/0453; H04W 72/0486; H04W 48/20; H04W 84/042; H04W 48/06; H04W 88/08; H04W 88/02
See application file for complete search history.

(56) References Cited

U.S. PATENT DOCUMENTS

| | | | |
|---|---|---|---|
| 8,411,590 B2 | 4/2013 | Wang | |
| 8,750,159 B2 | 6/2014 | Cheng et al. | |
| 8,848,558 B1* | 9/2014 | Martin | H04L 41/12 370/252 |
| 8,904,013 B2 | 12/2014 | Papakipos et al. | |
| 9,107,194 B2 | 8/2015 | Morris | |
| 2008/0225737 A1* | 9/2008 | Gong | H04L 47/824 370/252 |
| 2009/0290518 A1* | 11/2009 | Gossain | H04L 1/0026 370/310 |
| 2010/0115272 A1* | 5/2010 | Batta | H04L 45/00 713/162 |
| 2011/0182172 A1 | 7/2011 | Kulkarni | |
| 2011/0252090 A1* | 10/2011 | Garcia, Jr. | H04L 12/1827 709/204 |
| 2012/0307673 A1* | 12/2012 | Chang | H04B 7/15592 370/252 |
| 2013/0170335 A1* | 7/2013 | Pace | H04W 40/00 370/218 |
| 2015/0172991 A1* | 6/2015 | Petersen | H04W 40/12 370/252 |
| 2015/0382275 A1* | 12/2015 | Pragada | H04W 40/12 370/236 |
| 2016/0150451 A1* | 5/2016 | Barreto De Miranda | H04W 36/14 370/332 |

OTHER PUBLICATIONS

Tom Simonite; "Build Your Own Internet with Mobile Mesh Networking," Jul. 9, 2013, MIT Technology Review, pp. 1-3, retrieved on Nov. 13, 2015 from http://www.technologyreview.com/news/516571/build-your-own-internet-with-mobile-mesh-networking/.

* cited by examiner

SELECTION OF A MESH ACCESS POINT IN A WIRELESS MESH NETWORK

BACKGROUND

The present disclosure generally relates to wireless communications, and more particularly to selection of an access point in a wireless communications network.

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

An access point may connect a group of wireless devices to a wired network using some type of communications medium (e.g., Wi-Fi), and the wireless devices may communicate through the access point. In enterprise deployments, WLANs are typically used to provide end users access to network resources and network services and a gateway to the Internet. Institute of Electrical and Electronics Engineers (IEEE) defines a number of architectures for implementing a WLAN. IEEE 802.11 and 802.11x refers to a family of specifications developed by the IEEE for WLAN technology.

BRIEF SUMMARY

Methods, systems, and techniques are provided for selecting a mesh access point in a wireless communications network and using the selected mesh access point to connect to the wireless communications network.

According to an embodiment, a method of transmitting data to a destination node via a root access point and a mesh access point in a wireless communications network includes detecting, at a wireless device, a plurality of mesh nodes connected to a common communications medium used to access a wireless communications network. The method includes for at least two mesh nodes of the plurality of mesh nodes: (i) determining a hop distance between the respective mesh node and a root access point connected to the wireless communications network, where each mesh node of the plurality of mesh nodes is a descendant of the root access point; (ii) determining a quality of signal between the wireless device and the respective mesh node; (iii) determining a data bandwidth between the wireless device and the respective mesh node; (iv) determining a current number of mesh nodes using the respective mesh node as a wireless access point to connect to the wireless communications network; and (v) calculating a score for the respective mesh node, where the score is based on the hop distance, the quality of signal, the data bandwidth, and the current number of mesh nodes. The method further includes selecting, based on the calculated scores, a first mesh node of the plurality of mesh nodes. The method also includes transmitting data to a destination node via the first mesh node.

According to an embodiment, a system for transmitting data to a destination node via a root access point and a mesh access point in a wireless communications network includes a network interface card of a wireless device. The network interface card detects a plurality of mesh nodes connected to a common communications medium used to access a wireless communications network. The system also includes a scoring module that for at least two mesh nodes of the plurality of mesh nodes, (i) determines a hop distance between the respective mesh node and a root access point connected to the wireless communications network, where each mesh node of the plurality of mesh nodes is a descendant of the root access point, (ii) determines a quality of signal between the wireless device and the respective mesh node, (iii) determines a data bandwidth between the wireless device and the respective mesh node, (iv) determines a current number of mesh nodes using the respective mesh node as a wireless access point to connect to the wireless communications network, and (v) calculates a score, based on the hop distance, the quality of signal, the data bandwidth, and the current number of mesh nodes, for the respective mesh node. The scoring module selects, based on the calculated scores, a first mesh node of the plurality of mesh nodes. The network interface card transmits data to a destination node via the first mesh node.

According to another embodiment, a non-transitory machine-readable medium includes a plurality of machine-readable instructions that when executed by one or more processors are adapted to cause the one or more processors to perform a method including: detecting, at a wireless device, a plurality of mesh nodes connected to a common communications medium used to access a wireless communications network; for at least two mesh nodes of the plurality of mesh nodes: (i) determining a hop distance between the respective mesh node and a root access point connected to the wireless communications network, where each mesh node of the plurality of mesh nodes is a descendant of the root access point; (ii) determining a quality of signal between the wireless device and the respective mesh node; (iii) determining a data bandwidth between the wireless device and the respective mesh node; (iv) determining a current number of mesh nodes using the respective mesh node as a wireless access point to connect to the wireless communications network; and (v) calculating a score for the respective mesh node, where the score is based on the hop distance, the quality of signal, the data bandwidth, and the current number of mesh nodes; selecting, based on the calculated scores, a first mesh node of the plurality of mesh nodes; and transmitting data to a destination node via the first mesh node.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
III. Use a Mesh Node as a Mesh Access Point
  A. Calculate a Score for a Plurality of Mesh Nodes Connected on a Common Communications Medium
    1. Hop Distance
    2. Quality of Signal
    3. Data Bandwidth
    4. Current Number of Mesh Nodes Using a Particular Mesh Node as an Access Point
  B. Select a Mesh Access Point Based on the Calculated Scores
  C. Transmit Data to a Destination Node Using the Mesh Access Point
  D. Wireless Mesh Network Can Dynamically Change
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

A WLAN may include various devices that access the wireless network. Access points and client devices (also referred to as stations ("STAs")) are example devices that may access the network. Based on the 802.11 standard, an addressable unit used in the WLAN is considered an STA. In general, an access point serves as a hub or base station for the WLAN, and a client device serves as a user of the WLAN. For example, a client device may be a laptop computer, a personal digital assistant (PDA), a mobile phone, tablet, etc., or any other device that is capable of connecting to a wireless network. A client device connects to an access point via, for example, a Wi-Fi (e.g., an IEEE 802.11 protocol) compliant wireless link to obtain general connectivity to the Internet or to other wide area networks. In some implementations, a client device may also be used as an access point.

An access point may include, be implemented as, or known as a Radio Network Controller ("RNC"), Base Station Controller ("BSC"), Base Transceiver Station ("BTS"), Base Station ("BS"), Transceiver Function ("TF"), Radio Router, or Radio Transceiver. A client device may include, be implemented as, or known as an access terminal ("AT") a subscriber station, a subscriber unit, a mobile station, a mobile unit, a mobile device, a remote station, a remote terminal, a user terminal, a user agent, a user device, or user equipment. One or more aspects taught herein may be incorporated into a phone (e.g., a cellular phone or smartphone), a portable communication device, a headset, a portable computing device (e.g., a personal data assistant, a laptop, or a tablet), an entertainment device (e.g., a music or video device, or a satellite radio), a gaming device or system, a global positioning system device, or any other suitable device that is configured to communicate via a wireless medium. As discussed above, certain of the devices described herein may implement an IEEE 802.11 standard.

A wireless mesh network typically includes one or more wireless Wi-Fi or Wi-Max access points (generally referred to herein as "wireless access points," "WAPs," or mesh access points unless otherwise stated or apparent from the context of usage) or network bridges that eventually connect to a root access point that provides broadband access. The root access point is connected to both the wired and wireless network and bridges communications between the two. The root access point may also provide synchronization and coordination and forwarding of broadcast packets for all the associated nodes in the wireless mesh network.

The wireless mesh network is a self-organizing network built from multiple mesh nodes that may spontaneously create an impromptu network, assemble the network themselves, dynamically adapt to device failure and degradation, manage movement of mesh nodes, and react to changes in task and network requirements. The plural mesh nodes are reconfigurable smart network nodes that are self-aware, self-reconfigurable, and autonomous. The mesh network is a distributed network that may be represented as a tree graph structure, with the root access point being the root node in the tree graph structure and the other mesh nodes being descendants of the root access point. A mesh node is a descendant of the root access point if the mesh node is a direct child (directly connected to the root access point in the tree) or an indirect child of the root access point (not directly connected to the root access point in the tree, but a path in the tree exists from the root access point to the indirect child).

II. Example System Architecture

Figure 1:
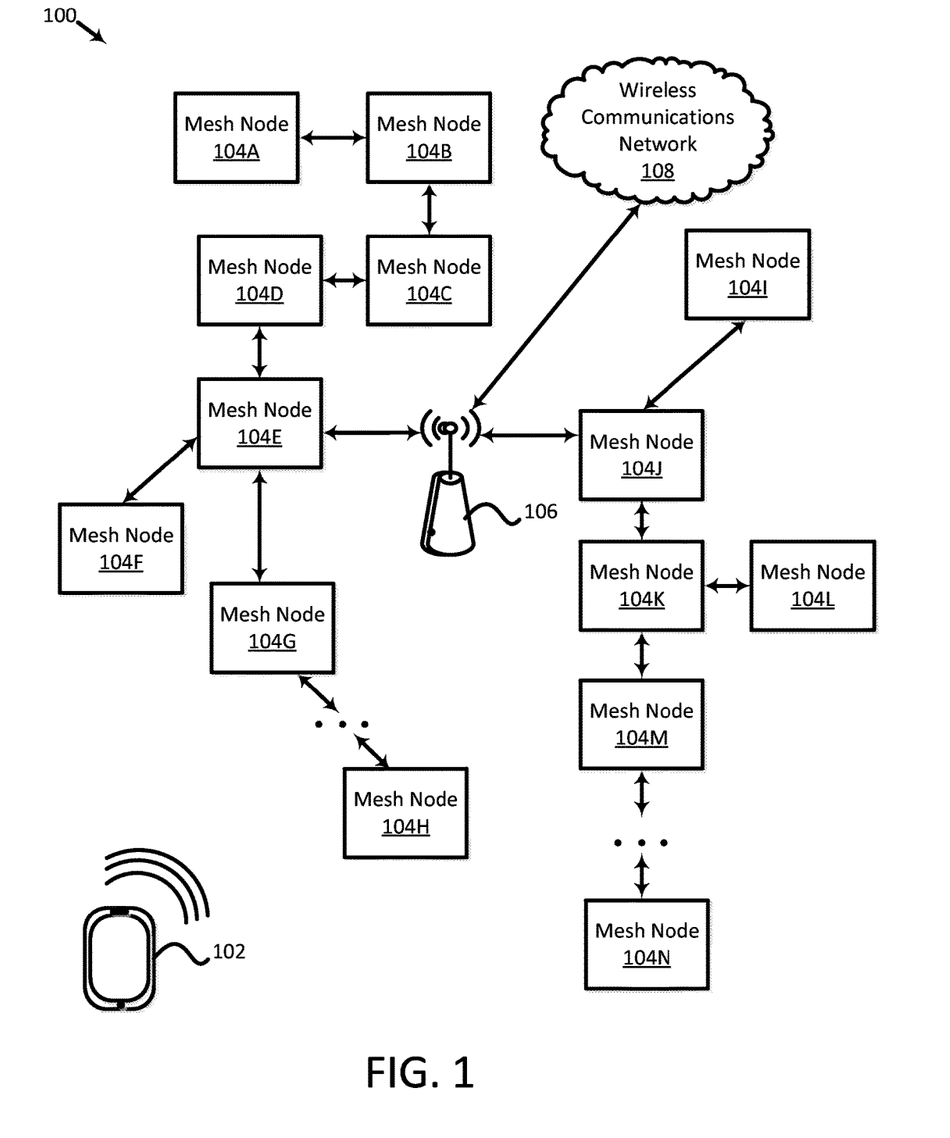
FIG. 1 is a block diagram illustrating a wireless communications system in accordance with one or more embodiments.

FIG. 1 is a block diagram illustrating a wireless communications system 100 in accordance with one or more embodiments. Wireless communications system 100 includes a wireless mesh network including mesh nodes 104A-104N and a root access point 106 that is connected to a wireless communications network 108. Although one root access point is illustrated, other embodiments including more than one access point are within the scope of the present disclosure. Wireless communications network 108 may be any network over which data may be sent. In some examples, wireless communications network 108 is the Internet. An access point may be a device that transmits and receives wireless signals to and from one or more mesh nodes and retransmits the signals to at least a subset of the network segment. The access point may connect a group of mesh nodes to wireless communications network 108 or two networks with each other. An access point may use directional or omnidirectional antennas. An access point may include a routing table and operate at the Transport Control Protocol (TCP)/Internet Protocol (IP) layer by assisting in the routing of data to its intended destination.

A mesh node in the wireless mesh network may connect to wireless communications network 108 and use root access point 106 or another mesh node as an access point to do so. In some examples, a mesh node is a client device that is used as an access point by another mesh node (e.g., a client device) to connect to wireless communications network 108. Each of the mesh nodes may be connected to a communications medium that may be used to transfer electromagnetic signals. In some examples, the communications medium operates pursuant to a wireless networking standard (e.g., (e.g., Wi-Fi, a set of GSM frequency bands, 802.11 or 802.11x family, etc.). A variety of processes and methods may be used for transmissions in the wireless mesh network between root access point 106 and one or more of mesh nodes 104A-104N. For example, signals may be sent and received between root access point 106 and a mesh node or between two mesh nodes in accordance with OFDM/OFDMA (Orthogonal Frequency-Division Multiple Access) techniques. In this example, a subset of the wireless mesh network may be referred to as an OFDM/OFDMA system. Alternatively, signals may be sent and received between root access point 106 and a mesh node or between two mesh nodes in accordance with CDMA (Code Division Multiple Access) techniques. In this example, a subset of the wireless mesh network may be referred to as a CDMA system.

A communication link that facilitates transmission from an access point to a mesh node may be referred to as a downlink, and a communication link that facilitates transmission from one or more mesh nodes to an access point may be referred to as an uplink (UL). Alternatively, the downlink may be referred to as a forward link or a forward channel, and the uplink may be referred to as a reverse link or a reverse channel.

A radio card is referred to by the 802.11 standard as a station (STA) and can reside in each of root access point 106 and mesh nodes 104A-104N. An access point may be thought of as a hub with a radio card and an antenna. In some examples, an access point may be associated with half-duplex communications that allow for only one radio card to transmit at any given time. The access point (e.g., a mesh node or root access point) may act as a base station and provide wireless communication coverage in a basic service area encompassing a set of mesh nodes (e.g., client devices). The radio card inside an access point contends for the half-duplex medium similarly to how the client device radio cards contend for the communications medium.

In FIG. 1, a wireless device 102 may desire to connect to wireless communications network 108. To do so, wireless device 102 connects to an access point that is connected to wireless communications network 108. Rather than use root access point 106 as the access point to connect to wireless communications network 108, wireless device 102 may detect one or more mesh nodes in the wireless mesh network and use one of these mesh nodes as an access point to connect to wireless communications network 108. Wireless device 102 may select a mesh node rather than root access point 106 for use as an access point because root access point 106 may already have a large number of client devices that are using the root access point 106 as an access point to connect to wireless communications network 108. Root access point 106 may have a threshold number of devices that it is capable of handling and connecting to wireless communications network 108. For example, if the number of devices that connect to root access point 106 is above the threshold number of devices, some of these devices may not be able to connect to root access point 106 at all. An advantage of a mesh node (e.g., client device) using another mesh node (e.g., client device) as a direct access point rather than root access point 106 as a direct access point to connect to wireless communications network 108 is that fewer devices are directly connected to root access point 106. A direct access point may refer to a zero hop distance between a mesh node and the access point with which the mesh node connects to connect to wireless communications network 108. Wireless device 102 may be connected to a mesh access point if wireless device 102 stores an IP address of the access point in wireless device 102's routing table and sends data to the access point, where a hop distance between wireless device 102 and the access point is zero. After wireless device 102 connects to a mesh node for usage as an access point, wireless device 102 may be connected to wireless communications network 108 and start to send data to and/or receive data from another device over wireless communications network 108.

Figure 2:
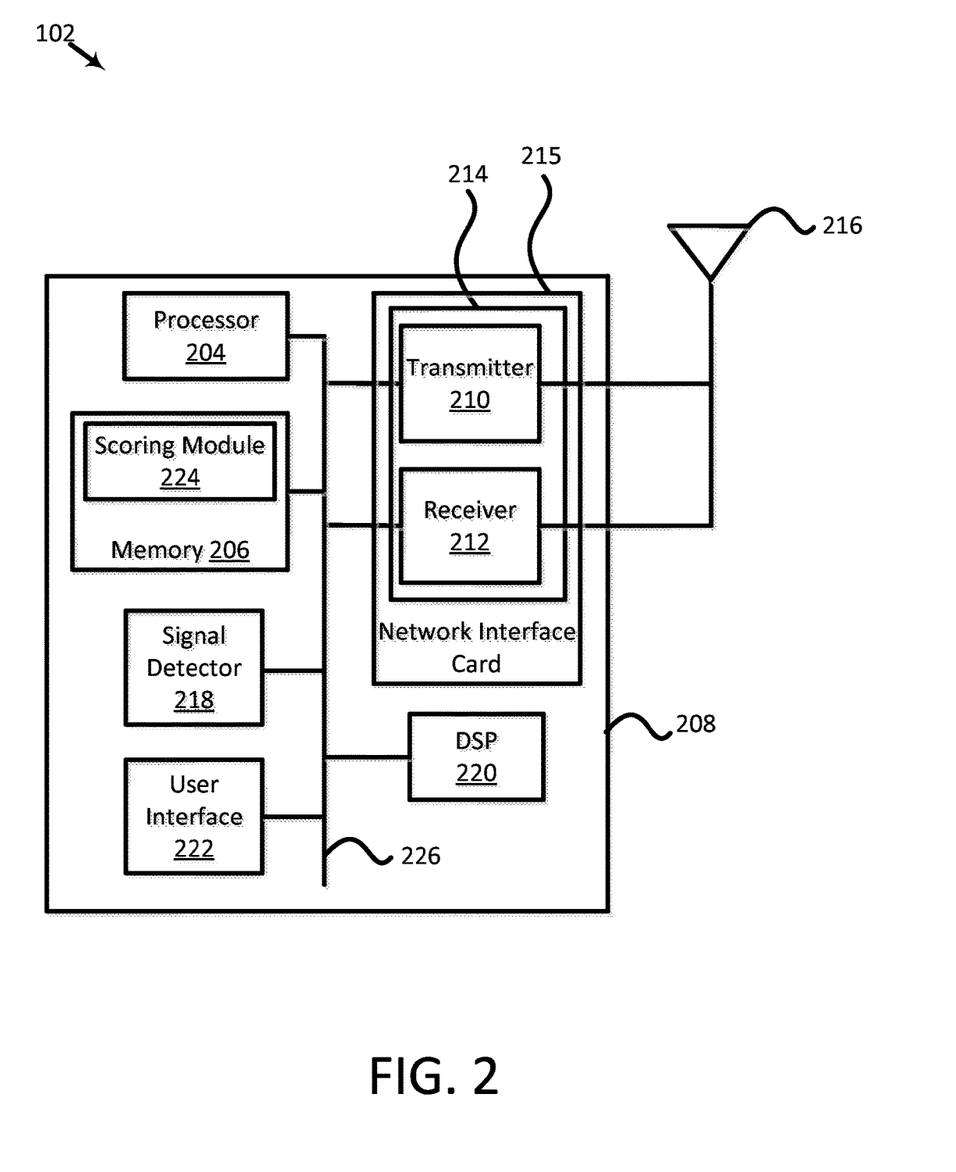
FIG. 2 illustrates various components that may be utilized in a wireless device in accordance with one or more embodiments.

FIG. 2 illustrates various components that may be utilized in wireless device 102 in accordance with one or more embodiments. Wireless device 102 is an example of a device that may be configured to implement the various methods described herein. Wireless device 102 may be any type of device having wireless capabilities. Wireless device 102 may include a processor 204 that controls operation of wireless device 102 and a memory 206. A "processor" may also be referred to as a "physical processor," "central processing unit," or "CPU" herein. A processor shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing system may also include machine-readable media for storing software. Software may include instructions that when executed by the one or more processors, cause the processing system to perform the various functions described herein.

Memory 206, which may include both read-only memory (ROM) and random access memory (RAM), provides instructions and data to processor 204. A portion of memory 206 may also include non-volatile random access memory (NVRAM). Processor 204 typically performs logical and arithmetic operations based on program instructions stored within memory 206. The instructions in memory 206 may be executable to implement the methods described herein.

Wireless device 102 may also include a housing 208 including a transmitter 210 and a receiver 212 to allow transmission and reception of data between wireless device 102 and a device spatially remote from wireless device 102. Transmitter 210 and receiver 212 may be combined into a transceiver 214 that may be built into a network interface card (NIC) 215. It should be understood that although a NIC 215 is shown, wireless device 102 may include built-in networking circuitry that is included in wireless device 102. Additionally, an antenna 216 may be attached to housing 208 and electrically coupled to transceiver 214. Wireless device 102 may also include (not shown) multiple transmitters, multiple receivers, multiple transceivers, and/or multiple antennas.

Wireless device 102 may also include a signal detector 218 that may be used in an effort to detect and quantify the level of signals received by transceiver 214. Signal detector 218 may detect such signals as total energy, energy per subcarrier per symbol, power spectral density, quality originator service signals, and other signals. Wireless device 102 may also include a digital signal processor (DSP) 220 for use in processing signals. DSP 220 may be configured to generate a data unit for transmission. In some aspects, the data unit may include a physical layer data unit (PPDU). In some aspects, the PPDU is referred to as a packet. Wireless device 102 may further include a user interface 222 in some aspects. User interface 222 may include a keypad, a microphone, a speaker, and/or a display. User interface 222 may include any element or component that conveys information to a user of wireless device 102 and/or receives input from the user.

In the example illustrated in FIG. 2, memory 206 includes a scoring module 224. As will be explained in more detail below, scoring module 224 calculates a score for one or more mesh nodes and selects, based on the calculated scores, a mesh node of the plurality of mesh nodes to connect to as a mesh access point for sending and received data over wireless communications network 108. In some examples, scoring module 224 is incorporated into the operating system of wireless device 102. In some examples, scoring module 224 is incorporated into the firmware of wireless device 102.

Various components of wireless device 102 may be coupled together by a bus system 226. Bus system 226 may include a data bus, for example, as well as a power bus, a control signal bus, and a status signal bus in addition to the data bus. It should be noted that the specific configuration of buses and communication interfaces between the different components shown in FIG. 2 is merely an example, and other configurations of computing devices with the same or different components may be used to implement the techniques of this disclosure. Additionally, the components of wireless device 102 may be coupled together or accept or provide inputs to each other using some other mechanism. Although a number of separate components are illustrated in FIG. 2, one or more of these components may be combined or commonly implemented. For example, processor 204 may be used to implement not only the functionality described above with respect to processor 204, but also to implement the functionality described with respect to signal detector 218 and/or DSP 220. Further, each of the components illustrated in FIG. 2 may be implemented using a plurality of separate elements.

Figure 3:
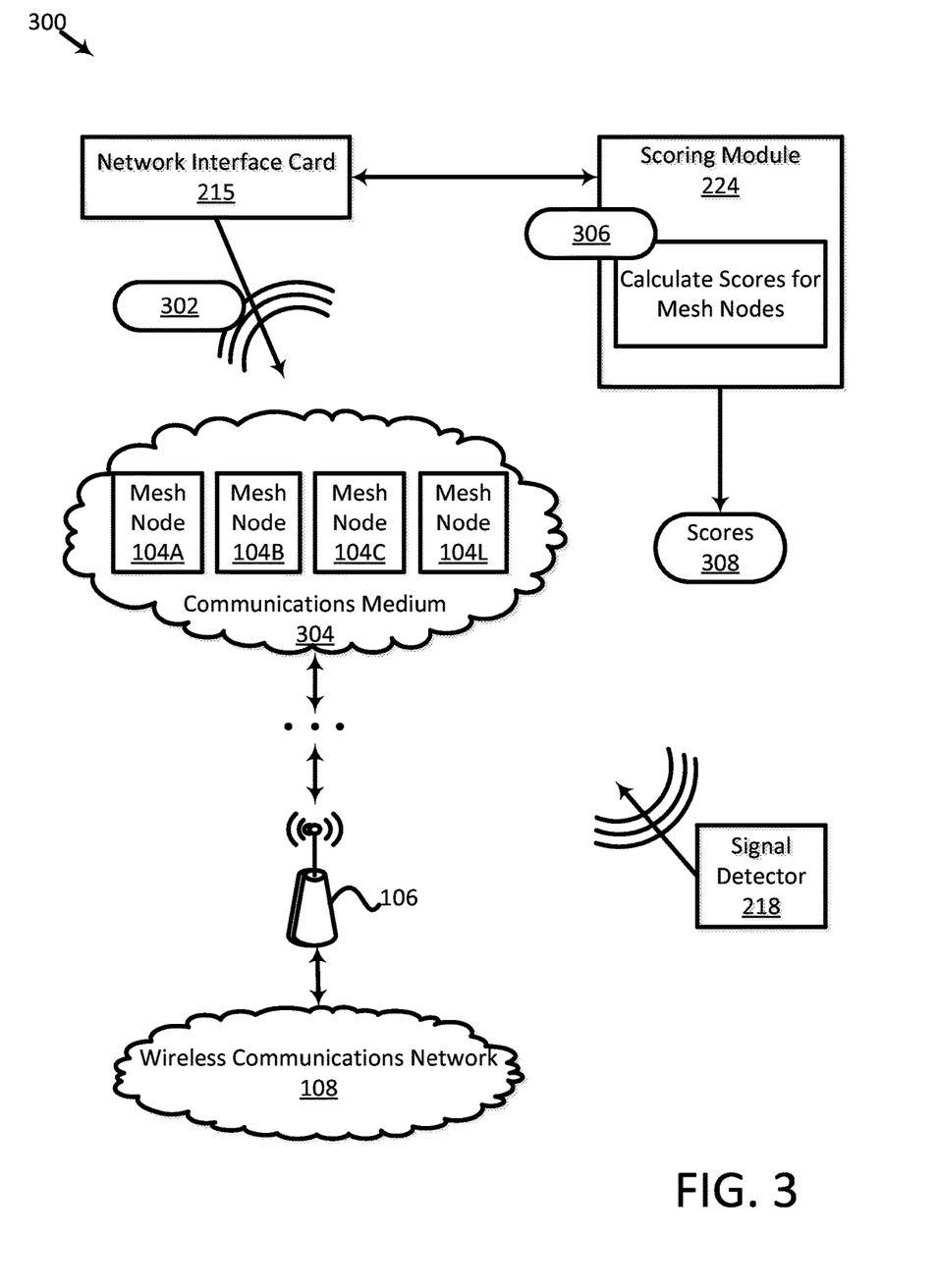
FIG. 3 illustrates a block diagram for selecting a mesh node in a wireless mesh network to connect to as an access point in accordance with one or more embodiments.

It may be desirable to connect wireless device 102 to the best access point as possible to provide the wireless device with the best data rate/signal/connection to wireless communications network 108. FIG. 3 illustrates a block diagram 300 for selecting a mesh node in a wireless mesh network to connect to as an access point in accordance with one or more embodiments. In FIG. 3, at an action 302, wireless device 102, via NIC 215, scans a common communications medium 304 for mesh nodes that are connected on the common communications medium. In some examples, communications medium 304 is Wi-Fi. In some examples, communications medium 304 is a set of frequency bands. Access points may operate within different frequency bands. For example, IEEE 802.11n supports operation in the 2.4-GHz and 5-GHz frequency bands, and IEEE 802.11ac supports operation in the 5-GHz frequency band. A first access point may operate in the 2.4-GHz frequency band and support 802.11n data rates, and a second access point may operate in the 5-GHz frequency band and support 802.11ac data rates. In an example, NIC 215 detects a plurality of mesh nodes (e.g., mesh nodes 104A-104C and 104L) connected to common communications medium 304, which is used to access wireless communications network 108. Root access point 106 may be directly connected to wireless communications network 108 via a wired connection.

III. Use a Mesh Node as a Mesh Access Point
A. Calculate a Score for a Plurality of Mesh Nodes Connected on a Common Communications Medium Wireless device 102 may select a mesh node of the plurality of mesh nodes for connecting to as a mesh access point and use the selected mesh node to connect to wireless communications network 108. Scoring module 224 calculates a score for one or more of the detected mesh nodes connected on common communications medium 304 and selects, based on the calculated scores, a mesh node of the plurality of nodes to connect to as an access point to connect to wireless communications network 108. Scoring module 224 may use different features of wireless device 102, features of the respective mesh node, and/or the architecture of the plurality of mesh nodes, etc., to calculate the score. In an example, the plurality of mesh nodes connected on communications medium 304 includes mesh nodes 104A-104C and 104L. Although four mesh nodes are illustrated as being connected on communications mesh 304, this is not intended to be limiting and fewer than or more than four mesh nodes may be connected on communications mesh 304. At an action 306, scoring module 224 calculates scores 308, where each score is for a mesh node of the plurality of mesh nodes connected on communications medium 304.

1. Hop Distance

In some examples, for at least two mesh nodes of the plurality of mesh nodes, scoring module 224 determines a hop distance between the respective mesh node and root access point 106, where each mesh node of the plurality of mesh nodes is a descendant of root access point 106. A hop is one portion of a path between a source node and a destination node. The source node sends a packet to a destination node. Each time a packet is passed to a next device that is not the destination node, a hop occurs. A hop distance refers to the number of intermediate devices (e.g., access point) through which data must pass between the source node and destination node of a packet.

For at least two mesh nodes of plurality of mesh nodes 104A-104C and 104L, scoring module 224 may determine a hop distance between the respective mesh node and root access point 106, where each mesh node of plurality of mesh nodes 104A-104C and 104L is a descendant of root access point 106. Scoring module 224 may calculate a score for the respective mesh node, where the score is based on a hop distance between the respective mesh node and root access point 106. In some examples, wireless device 102 determines the hop distance between the respective mesh node and root access point 106 at the Transport Control Layer (TCP)/Internet Protocol (IP) layer.

Wireless device 102 may determine the hop distance between a mesh node and root access point 106 in a variety of ways. In an example, scoring module 224 may transmit a set of data packets to mesh nodes 104A-104C and 104L. The set of data packets may include a request for the hop distance between the respective mesh node and root access point 106. In such an example, one or more of the mesh nodes connected on communications medium 304 may receive the set of data packets with the hop distance request and return their respective hop distance from root access point 106 to scoring module 224. Referring back to FIG. 1, for mesh node 104A, a hop distance between mesh node 104A and root access point 106 is four because in order for mesh node 104A to send a packet to root access point 106, the packet starts at the source node (mesh node 104A), which sends the packet to mesh node 104B, which increases the hop distance to 1 and sends the packet to mesh node 104C, which increases the hop distance of 1 by 1 to be 2 and sends the packet to mesh node 104D, which increases the hop distance of 2 by 1 to be 3 and sends the packet to mesh node 104E, which increases the hop distance of 3 by 1 to be 4 and sends the packet to root access point 106, which is the destination node. In this example, the packet passes through four intermediate devices before it reaches the destination node.

For mesh node 104L, a hop distance between mesh node 104L and root access point 106 is two because in order for mesh node 104L to send a packet to root access point 106, the packet starts at the source node (mesh node 104L), which sends the packet to mesh node 104K, which increases the hop distance to 1 and sends the packet to mesh node 104J, which increases the hop distance of 1 by 1 to be 2 and sends the packet to root access point 106, which is the destination node. In this example, the packet passes through two intermediate devices before it reaches the destination node.

The lower the hop distance, the fewer devices data packets between wireless device 102 and the respective mesh node must traverse. It may be desirable for scoring module 224 to select a mesh node having a lower hop distance from wireless device 102 to connect to as an access point. Scoring module 224 may apply a weight to the hop distance relative to other factors that are used to calculate the score. Additionally, wireless device 102 may determine the hop distance between the respective mesh node and root access point 106 at the TCP/IP layer.

2. Quality of Signal

In the example illustrated in FIG. 3, for at least two mesh nodes of plurality of mesh nodes 104A-104C and 104L, scoring module 224 may determine a quality of signal between wireless device 102 and the respective mesh node. Scoring module 224 may calculate a score for the respective mesh node, where the score is based on the quality of signal between wireless device 102 and the respective mesh node.

Wireless device 102 may determine the quality of signal of a connection between wireless device 102 and the respective mesh node in a variety of ways. In an example, the set of data packets includes a request for the quality of signal between wireless device 102 and the respective mesh node. In such an example, one or more of the mesh nodes connected on communications medium 304 may receive the set of data packets with the quality of signal request and return their respective quality of signal to scoring module 224. In this example, the respective mesh node sends the quality of signal information to wireless device 102.

Referring back to FIG. 2, signal detector 218 may determine a quality of signal between wireless device 102 and the respective mesh node. In an example, NIC 215 connects to each of mesh nodes 104A-104C and 104L and communicates with the respective mesh node. Based on the connection with a mesh node, signal detector 218 may determine the quality of signal between wireless device 102 and the respective mesh node. Scoring module 224 may apply a weight to the quality of signal relative to other factors that are used to calculate the score. Additionally, wireless device 102 may determine the quality of signal of a connection between wireless device 102 and the respective mesh node at the TCP/IP layer.

3. Data Bandwidth

A mesh access point may dedicate some bandwidth to each mesh node that is connected to the mesh access point and using it as an access point to connect to a network. The data bandwidth may refer to the quality of service that the respective mesh node may be able to provide or guarantee to another mesh node (e.g., wireless device 102) desiring to use the respective mesh node as a mesh access point to connect to wireless communications network 108.

In some examples, for at least two mesh nodes of plurality of mesh nodes 104A-104C and 104L, scoring module 224 may determine a data bandwidth between wireless device 102 and the respective mesh node. Scoring module 224 may calculate a score for the respective mesh node, where the score is based on the data bandwidth of a potential connection between wireless device 102 and the respective mesh node. Signal detector 218 may determine the data bandwidth between wireless device 102 and the respective mesh node in a variety of ways. In an example, NIC 215 connects to each of mesh nodes 104A-104C and 104L and communicates with the respective mesh node. Based on the connection and communication(s) with the respective mesh node, signal detector 218 may determine the data bandwidth between wireless device 102 and the respective mesh node.

Wireless device 102 may determine the data bandwidth between wireless device 102 and the respective mesh node in a variety of ways. In an example, scoring module 224 may transmit a set of data packets to mesh nodes 104A-104C and 104L. In an example, the set of data packets includes a request for the data bandwidth between wireless device 102 and the respective mesh node. In such an example, one or more of the mesh nodes connected on communications medium 304 may receive the set of data packets with the data bandwidth request and return their respective data bandwidth between wireless device 102 and the respective mesh node to scoring module 224. In this example, the respective mesh node sends the bandwidth information to wireless device 102. Scoring module 224 may apply a weight to the bandwidth connection relative to other factors that are used to calculate the score. Additionally, wireless device 102 may determine the data bandwidth between wireless device 102 and the respective mesh node at the TCP/IP layer.

4. Current Number of Mesh Nodes Using a Particular Mesh Node as an Access Point

In some examples, for at least two mesh nodes of the plurality of mesh nodes, scoring module 224 determines a current number of mesh nodes using the respective mesh node as a wireless access point to connect to wireless communications network 108. Scoring module 224 may calculate a score for the respective mesh node, where the score is based on a current number of mesh nodes using the respective mesh node as a wireless access point to connect to the wireless communications network. If a set of mesh nodes is using a mesh access point to connect to wireless communications network 108, the mesh access point is routing data to and/or from the set of mesh nodes at the TCP/IP layer. For example, the mesh access point may not care what the payload of the packets contains, but rather is more concerned with the route that the packets take to reach their destination.

Wireless device 102 may determine the current number of mesh nodes using the respective mesh node as a wireless access point to connect to wireless communications network 108 in a variety of ways. In an example, scoring module 224 may transmit a set of data packets to mesh nodes 104A-104C and 104L. The set of data packets may include a request for the current number of mesh nodes using the respective mesh node as a wireless access point to connect to wireless communications network 108. In such an example, one or more of the mesh nodes connected on communications medium 304 may receive the set of data packets with the "current number of nodes" request and return this number to scoring module 224. In another example, root access point 106 or another mesh access point may refuse to connect more than a threshold number of nodes to it. In this example, wireless device 102 may determine the mesh node or root access point 106 is connected to the maximum threshold number of nodes if the mesh node or root access point 106, respectively, refuses to allow the wireless device to connect to it.

Scoring module 224 may apply a weight to the current number of mesh nodes using the respective mesh node as a wireless access point to connect to wireless communications network 108 relative to other factors that are used to calculate the score. Additionally, wireless device 102 may determine the current number of mesh nodes using the respective mesh node as a wireless access point to connect to wireless communications network 108 at the TCP/IP layer.

Although four features have been described above as affecting the score for a mesh node, other features are within the scope of embodiments of the disclosure. Additionally, in some examples, scoring module 224 may broadcast an IP packet to at least two mesh nodes of plurality of mesh nodes 104A-104C and 104L, where the IP packet includes a request for at least one of the data bandwidth between the wireless device and the respective mesh node, the current number of mesh nodes using the respective mesh node as a wireless access point to connect to the wireless communications network, the hop distance between the respective mesh node and the root access point, and the quality of signal between the wireless device and the respective mesh node.

B. Select a Mesh Access Point Based on the Calculated Scores

Scoring module 224 calculates a score for one or more mesh nodes of the plurality of mesh nodes. In some examples, the score for a mesh node is based on the hop distance between the respective mesh node and a root access point, the quality of signal between the wireless device and the respective mesh node, the data bandwidth between the wireless device and the respective mesh node, and/or the current number of mesh nodes using the respective mesh node as a wireless access point to connect to the wireless communications network. In an example, the score is calculated using the following score function: ((hop distance between the respective mesh node and root access point 106)* A)+((quality of signal between the wireless device and the respective mesh node)* B)+((data bandwidth between the wireless device and the respective mesh node)* C)+((current number of mesh nodes using the respective mesh node as a wireless access point to connect to the wireless communications network)* D), where A, B, D, and D are constant numbers.

Scoring module 224 selects, based on the calculated scores, a mesh node of plurality of mesh nodes 104A-104C and 104L to connect to as a mesh access point in order to connect to wireless communications network 108. In an example, a score of the selected mesh node is higher than a score of another mesh node of plurality of mesh nodes 104A-104C and 104L. In such an example, the score of the selected mesh node may be the highest score of the calculated scores. In another example, a score of the selected mesh node is lower than a score of another mesh node of plurality of mesh nodes 104A-104C and 104L. In such an example, the score of the selected mesh node may be the lowest score of the calculated scores.

Scoring module 224 stores an IP address of the selected mesh node into a routing table of wireless device 102. If wireless device 102 desires to send data over wireless communications network 108, wireless device 102 may retrieve the IP address of this mesh access point and send the data to this IP address. A hop distance between wireless device 102 and the selected mesh node may be zero, and a hop distance between wireless device 102 and root access point 106 may be at least one.

C. Transmit Data to a Destination Node Using the Mesh Access Point

Wireless device 102 may connect, using the selected mesh node as the mesh access point, to wireless communications network 108. After wireless device 102 connects to the selected mesh node as the mesh access point, wireless device 102 may send data over wireless communications network 108. Scoring module 224 transmits data to a destination node via root access point 106 and the selected mesh access point. Root access point 106 and the selected mesh access point may be thought of as "pass through" devices that assist in routing data to their appropriate destination nodes. Root access point 106 and the selected mesh access point may not care about the payload of the data packets received from wireless device 102, but rather about the path traversed by the data packets.

The destination node is connected to wireless communications network 108 and is capable of receiving data from and/or sending data to computing devices over the wireless communications network. Wireless device 102 and the destination node may communicate bi-directionally. In an example, wireless device 102 transmits a first set of data packets to a destination node via root access point 106 and the selected mesh node. In such an example, a destination address of the first set of data packets may be associated with the destination node and may be different from the destination addresses of root access point 106 and the selected mesh node. The first set of data packets may pass through the selected access point subsequently pass through root access point 106 and traverse wireless communications network 108 until the first set of data packets arrives at the destination node. Additionally, the destination node may send wireless device 102 a second set of data packets. Wireless device 102 may receive the second set of data packets from the destination node in response to the first set of data packets, where a source address of the second set of data packets is the same as the destination address of the first set of data packets.

D. Wireless Mesh Network can Dynamically Change

Mesh nodes that are part of the wireless mesh network may dynamically change. At any given time, a mesh node may be added to or removed from the wireless mesh network. For example, wireless device 102 may be added to the wireless mesh network. Additionally, after wireless device 102 connects to a mesh access point, wireless device 102 may be used as a mesh access point for another wireless device. In this example, wireless device 102 may be used by another mesh node to connect to wireless communications network 108.

After wireless device 102 connects to a first mesh node to connect to wireless communications network 108, other mesh nodes in the wireless mesh network may provide wireless device 102 with a better data rate/signal/connection to wireless communications network 108 than the first selected mesh access point. In some examples, after wireless device 102 connects to the first selected mesh access point, NIC 215 of wireless device 102 may detect a second plurality of mesh nodes connected to common communications medium 304. The second plurality of mesh nodes may be different from mesh nodes 104A-104C and 104L because one or more mesh nodes may have connected onto or disconnected from communications medium 304. In such an example, for at least two mesh nodes of the second plurality of mesh nodes, scoring module 224 may calculate a score for the respective mesh node. As discussed, the score for a mesh node may be based on the hop distance between the respective mesh node and root access point 106, the quality of signal between the wireless device and the respective mesh node, the data bandwidth between the wireless device and the respective mesh node, and/or the current number of mesh nodes using the respective mesh node as a wireless access point to connect to wireless communications network 108.

Scoring module 224 selects, based on these calculated scores, a second mesh node of the plurality of mesh nodes to connect to as the mesh access point to connect to wireless communications network 108. Wireless device 102 may connect, using the second mesh node as the mesh access point (second mesh access point), to wireless communications network 108. Wireless device 102 may transmit data to a destination node via root access point 106 and the second mesh access point.

Wireless device 102 may constantly switch its source of data because it is detecting a plurality of mesh nodes and calculating scores for them to compare. For example, wireless device 102 may switch from connecting to mesh node 104A as an access point to connecting to mesh node 104B as an access point, etc. It may be desirable to prevent wireless device 102 from switching to another access point until a threshold period of time has elapsed in order to reduce the switching of access points. In such an example, wireless device 102 may be unable to use another device as an access point for a threshold period of time (e.g., a couple of minutes) to prevent constant switching in the network.

In some examples, wireless device 102 determines whether a threshold period of time has elapsed. In response to a determination that the threshold period of time has elapsed, NIC 215 detects the second plurality of mesh nodes. As such, NIC 215 waits a threshold period of time before scanning communications medium 304 for devices.

In some examples, wireless device 102 connects to the second selected access point after a period of time has elapsed since connecting to the previous selected access point. In an example, wireless device 102 determines whether the first selected mesh access point is the same as the second selected mesh access point. In response to a determination that the first and second selected mesh access points are the same, wireless device 102 may wait for the threshold period of time to elapse. In an example, wireless device 102 re-connects, using the first selected mesh node as the mesh access point, to wireless communications network 108 after the threshold period of time has elapsed. In another example, wireless device 102 recognizes that the first and second selected mesh access points are the same and maintains its connection to the first selected mesh access point. In this example, wireless device 102 does not re-connect to wireless communications network 108.

Additionally, wireless device 102 may disconnect from communications medium 304 and attempt to connect to another communications medium. In this example, wireless device 102 may perform the above actions in relation to the other communications medium.

As discussed above and further emphasized here, FIGS. 1-3 are merely examples, which should not unduly limit the scope of the claims. For example, it should be understood that one or more components may be combined with another component. It should also be understood that a component may be separated into more than one component.

III. Example Method

Figure 4:
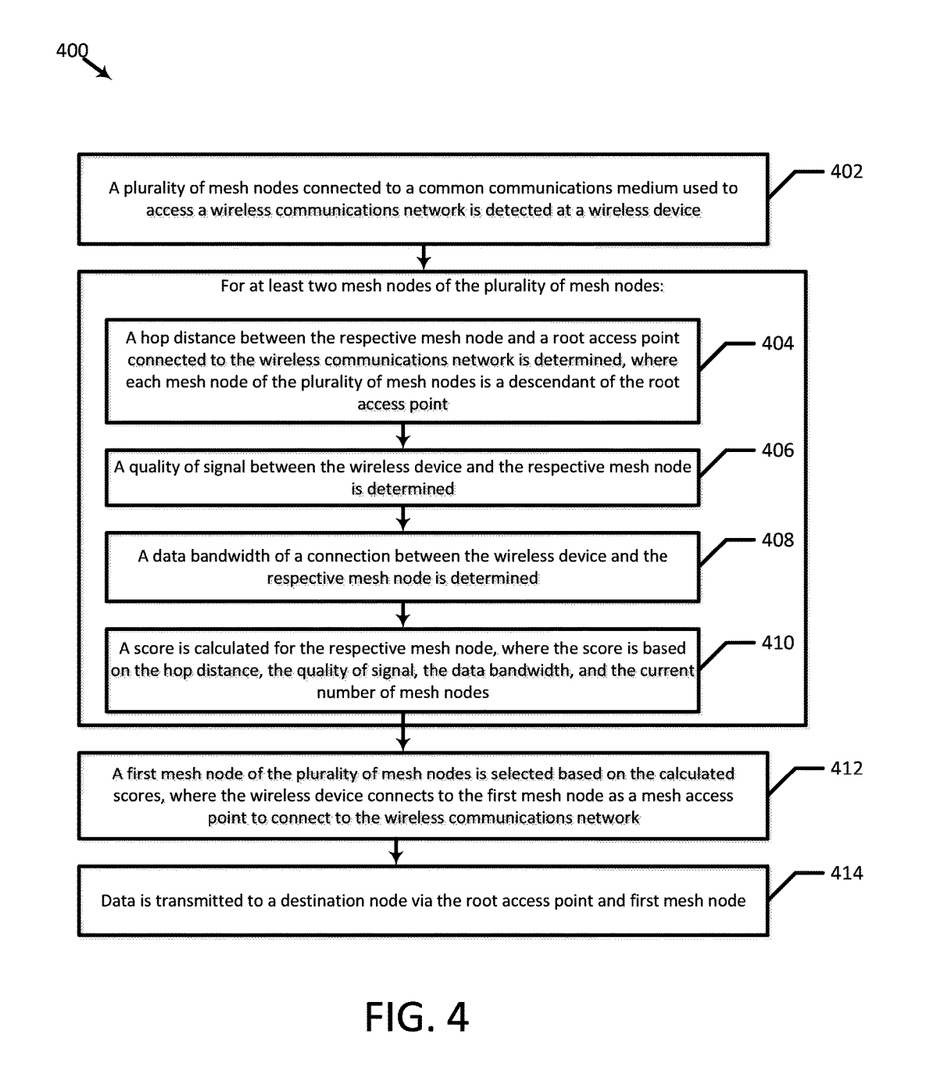
FIG. 4 is a flowchart illustrating a method of selecting a mesh node in a wireless mesh network to connect to as an access point in accordance with one or more embodiments.

FIG. 4 is a flowchart illustrating a method 400 of selecting a mesh node in a wireless mesh network to connect to as an access point in accordance with one or more embodiments. Method 400 is not meant to be limiting and may be used in other applications.

Method 400 includes blocks 402-414. In a block 402, a plurality of mesh nodes connected to a common communications medium used to access a wireless communications network is detected at a wireless device. In an example, NIC 215 detects, at wireless device 102, plurality of mesh nodes 104A-104C and 104L connected to common communications medium 104 used to access wireless communications network 108.

For at least two mesh nodes of the plurality of mesh nodes, blocks 404, 406, 408, and 410 may be executed. In block 404, a hop distance between the respective mesh node and a root access point connected to the wireless communications network is determined, where each mesh node of the plurality of mesh nodes is a descendant of the root access point. In an example, scoring module 224 determines a hop distance between the respective mesh node and root access point 106 connected to wireless communications network 108, where each mesh node of plurality of mesh nodes 104A-104C and 104L is a descendant of root access point 106. In block 406, a quality of signal between the wireless device and the respective mesh node is determined. In an example, scoring module 224 determines a quality of signal between wireless device 102 and the respective mesh node. In block 108, a data bandwidth between the wireless device and the respective mesh node is determined. In an example, scoring module 224 determines a data bandwidth between wireless device 102 and the respective mesh node. In block 410, a current number of mesh nodes using the respective mesh node as a wireless access point to connect to the wireless communications network is determined. In an example, scoring module 224 determines a current number of mesh nodes using the respective mesh node as a wireless access point to connect to wireless communications network 108.

In a block 412, a first mesh node of the plurality of mesh nodes is selected based on the calculated scores. The wireless device connects to the first mesh node as a mesh access point. In an example, scoring module 224 selects, based on the calculated scores, mesh node 104B of plurality of mesh nodes 104A-104C and 104L to connect to as a mesh access point to connect to wireless communications network 108. In a block 414, data is transmitted to a destination node via the first mesh node. In an example, NIC 215 transmits data to a destination node via mesh access point 104B. The data may also be transmitted via root access point 106.

In some embodiments, one or more actions illustrated in blocks 402-412 may be performed for any number of times wireless device 102 wishes to select a mesh node to connect to as a mesh access point. Additional processes may be inserted before, during, or after blocks 402-414 discussed above. It should also be understood that one or more of the blocks of method 400 described herein may be omitted, combined, or performed in a different sequence as desired.

IV. Example Computing System

Figure 5:
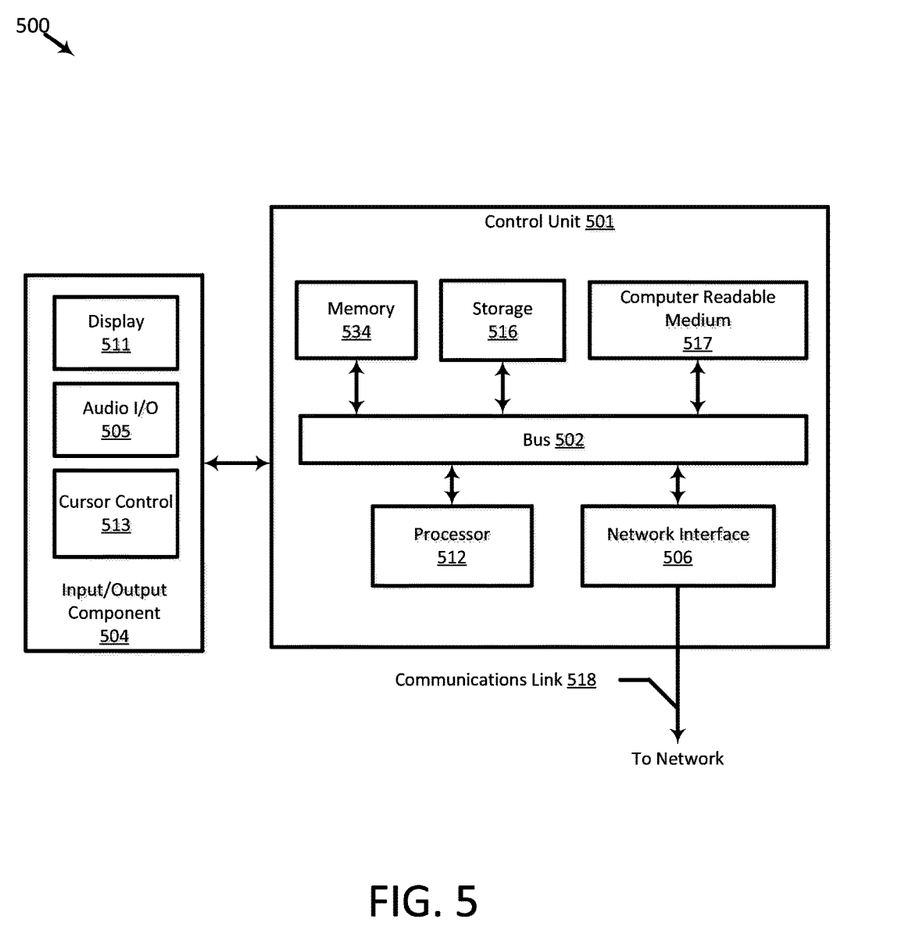
FIG. 5 is a block diagram of an electronic system suitable for implementing one or more embodiments of the present disclosure.

FIG. 5 is a block diagram of a computer system 500 suitable for implementing one or more embodiments of the present disclosure. Scoring module 224 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to another computing device using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. A processor 512, which may be a micro-controller, digital signal processor (DSP), or other processing component, processes these various signals, such as for display on computer system 500 or transmission to other devices via communications link 518. Components of computer system 500 also include a system memory component 534 (e.g., RAM), a static storage component 516 (e.g., ROM), and/or a computer readable medium 517. Computer system 500 performs specific operations by processor 512 and other components by executing one or more sequences of instructions contained in system memory component 534.

Components include an input/output (I/O) component 504 that processes a user action, such as selecting keys from a keypad/keyboard, selecting one or more buttons or links, etc., and sends a corresponding signal to bus 502. I/O component 404 may include an output component such as a display 511, and an input control such as a cursor control 513 (such as a keyboard, keypad, mouse, etc.). An optional audio I/O component 505 may also be included to allow a user to use voice for inputting information by converting audio signals into information signals. Audio I/O component 505 may allow the user to hear audio. A transceiver or network interface 506 transmits and receives signals between computer system 500 and other devices via communications link 518 to a network. In an embodiment, the transmission is wireless, although other transmission mediums and methods may also be suitable.

Logic may be encoded in computer readable medium 517, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 400) to practice the present disclosure may be performed by computer system 500. In various other embodiments of the present disclosure, a plurality of computer systems 500 coupled by communications link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa. Application software in accordance with the present disclosure may be stored on one or more computer readable media. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of transmitting data to a destination node via a root access point and a mesh access point in a wireless communications network, comprising:

detecting, at a first user equipment (UE), a first plurality of mesh nodes and a second plurality of mesh nodes connected to a common communications medium used to access a wireless communications network;

for at least two mesh nodes of the first plurality of mesh nodes and for at least two mesh nodes of the second plurality of nodes:

determining a hop distance between the respective mesh node and a root access point connected to the wireless communications network, wherein each mesh node of the first and second plurality of mesh nodes is a descendant of the root access point;

determining a quality of signal between the first UE and
the respective mesh node;
determining a data bandwidth between the first UE and
the respective mesh node;
determining a current number of mesh nodes using the
respective mesh node as a wireless access point to
connect to the wireless communications network;
and
calculating a score for the respective mesh node,
wherein the score is based on the hop distance, the
quality of signal, the data bandwidth, and the current
number of mesh nodes;
selecting, based on at least two of the calculated scores, a
first mesh node of the first plurality of mesh nodes, the
first mesh node being a second UE that is used as a
mesh access point by the first UE to connect to the
wireless communications network
selecting, based on at least two of the calculated scores, a
second mesh node of the second plurality of mesh
nodes;
transmitting data to a destination node via the first mesh
node;
determining whether the first mesh node is the same as the
second mesh node;
in response to a determination that the first and second
mesh nodes are the same, waiting for a threshold period
of time to elapse; and
re-connecting, using the first mesh node as a mesh access
point, the first UE to the wireless communications
network after the threshold period of time has elapsed.

2. The method of claim 1, wherein a hop distance between the first UE and the first mesh node is zero, and a hop distance between the first UE and the root access point is at least one.

3. The method of claim 2, further comprising:
storing an Internet Protocol (IP) address of the first mesh node into a routing table of the first UE.

4. The method of claim 1, wherein transmitting data includes transmitting a set of data packets to the destination node via the root access point and first mesh node, and a destination address of the set of data packets is associated with the destination node and is different from destination addresses of the root access point and first mesh node.

5. The method of claim 4, wherein the first UE and destination node communicate bi-directionally, the method further comprising:
receiving, at the first UE, a second set of data packets from the destination node in response to the first set of data packets.

6. The method of claim 5, wherein a source address of the second set of data packets is the same as the destination address of the first set of data packets.

7. The method of claim 1, further comprising:
transmitting second data to a second destination node via the second mesh node.

8. The method of claim 7, further including:
connecting, using the first mesh node as the mesh access point, the first UE to the wireless communications network; and
connecting, using the second mesh node as the mesh access point, the first UE to the wireless communications network.

9. The method of claim 8, wherein connecting, using the second mesh node as the mesh access point, the first UE to the wireless communications network includes connecting, using the second mesh node as the mesh access point, the first UE to the wireless communications network after the threshold period of time has elapsed.

10. The method of claim 7, further comprising:
determining whether the threshold period of time has elapsed, wherein detecting the second plurality of mesh nodes includes in response to a determination that the threshold period of time has elapsed, detecting the second plurality of mesh nodes.

11. The method of claim 1, further comprising:
broadcasting an Internet Protocol (IP) packet to the at least two mesh nodes of the first plurality of mesh nodes,
wherein the IP packet includes a request for at least one of the data bandwidth between the first UE and the respective mesh node, the current number of mesh nodes using the respective mesh node as a wireless access point to connect to the wireless communications network, the hop distance between the respective mesh node and the root access point, and the quality of signal between the first UE and the respective mesh node.

12. A system comprising:
a non-transitory memory; and
one or more hardware processors coupled to the non-transitory memory and configured to read instructions from the non-transitory memory to cause the system to perform operations comprising:
detecting, at a first user equipment (UE), a first plurality of mesh nodes and a second plurality of mesh nodes connected to a common communications medium used to access a wireless communications network;
for at least two mesh nodes of the first plurality of mesh nodes and for at least two mesh nodes of the second plurality of nodes:
determining a hop distance between the respective mesh node and a root access point connected to the wireless communications network, wherein each mesh node of the first and second plurality of mesh nodes is a descendant of the root access point;
determining a quality of signal between the first UE and the respective mesh node;
determining a data bandwidth between the first UE and the respective mesh node;
determining a current number of mesh nodes using the respective mesh node as a wireless access point to connect to the wireless communications network; and
calculating a score for the respective mesh node, wherein the score is based on the hop distance, the quality of signal, the data bandwidth, and the current number of mesh nodes;
selecting, based on at least two of the calculated scores, a first mesh node of the first plurality of mesh nodes, the first mesh node being a second UE that is used as a mesh access point by the first UE to connect to the wireless communications network
selecting, based on at least two of the calculated scores, a second mesh node of the second plurality of mesh nodes;
transmitting data to a destination node via the first mesh node;
determining whether the first mesh node is the same as the second mesh node;
in response to a determination that the first and second mesh nodes are the same, waiting for a threshold period of time to elapse; and re-connecting, using the first mesh node as a mesh access point, the first UE to the wireless communications network after the threshold period of time has elapsed.

13. The system of claim 12, wherein a network interface card scans the common communications medium for the first plurality of mesh nodes.

14. The system of claim 13, wherein the common communications medium is a Wi-Fi network.

15. The system of claim 13, wherein the common communications medium is a set of GSM frequency bands.

16. The system of claim 12, wherein the at least two mesh nodes of the first plurality of mesh nodes includes a third mesh node, and a score of the first mesh node is higher than a score of the third mesh node.

17. The system of claim 12, wherein the at least two mesh nodes of the first plurality of mesh nodes includes a third mesh node, and a score of the first mesh node is lower than a score of the third mesh node.

18. The system of claim 12, wherein the first mesh node has the lowest calculated score of the calculated scores.

19. The system of claim 12, the operations further comprising:
  disconnecting, at the first UE, from the first mesh node.

20. A non-transitory machine-readable medium comprising a plurality of machine-readable instructions that when executed by one or more processors are adapted to cause the one or more processors to perform a method comprising:
  detecting, at a first user equipment (UE), a first plurality of mesh nodes and a second plurality of mesh nodes connected to a common communications medium used to access a wireless communications network;
  for at least two mesh nodes of the first plurality of mesh nodes and for at least two mesh nodes of the second plurality of nodes:
    determining a hop distance between the respective mesh node and a root access point connected to the wireless communications network, wherein each mesh node of the first and second plurality of mesh nodes is a descendant of the root access point;
    determining a quality of signal between the first UE and the respective mesh node;
    determining a data bandwidth between the first UE and the respective mesh node;
    determining a current number of mesh nodes using the respective mesh node as a wireless access point to connect to the wireless communications network; and
    calculating a score for the respective mesh node, wherein the score is based on the hop distance, the quality of signal, the data bandwidth, and the current number of mesh nodes;
  selecting, based on at least two of the calculated scores, a first mesh node of the first plurality of mesh nodes, the first mesh node being a second UE that is used as a mesh access point by the first UE to connect to the wireless communications network;
  selecting, based on at least two of the calculated scores, a second mesh node of the second plurality of mesh nodes;
  transmitting data to a destination node via the first mesh node;
  determining whether the first mesh node is the same as the second mesh node;
  in response to a determination that the first and second mesh nodes are the same, waiting for a threshold period of time to elapse; and
  re-connecting, using the first mesh node as a mesh access point, the first UE to the wireless communications network after the threshold period of time has elapsed.

* * * * *